April 24, 1928.

H. H. SMITH 1,667,272

PROCESS FOR THE PRODUCTION OF GAS

Filed Sept. 14, 1922

INVENTOR
Harold Hardy Smith
BY Williams & Pritchard
ATTORNEYS

April 24, 1928.

H. H. SMITH 1,667,272

PROCESS FOR THE PRODUCTION OF GAS

Filed Sept. 14, 1922

INVENTOR
Harold Hardy Smith
BY Williams & Pritchard
ATTORNEYS

Patented Apr. 24, 1928.

1,667,272

UNITED STATES PATENT OFFICE.

HAROLD HARDY SMITH, OF JOHANNESBURG, SOUTH AFRICA, ASSIGNOR TO MINERALS SEPARATION NORTH AMERICAN CORPORATION, OF NEW YORK, N. Y., A CORPORATION OF MARYLAND.

PROCESS FOR THE PRODUCTION OF GAS.

Application filed September 14, 1922. Serial No. 588,127.

This invention relates to the production of gas, and is herein disclosed as a process for the production of a gas consisting largely of hydrogen sulphide, carrying carbon dioxide and some other substances in gaseous and vapor form and which is especially adapted to be used for treating ores for froth-flotation purposes.

As disclosed herein, the gas may be produced from relatively cheap and naturally occurring sulphides, such as sulphide of iron, or the sulphides of copper which form the common ores of copper. For this purpose it is advantageous to have the sulphide material fairly finely ground, since the reactions to a large extent seem to be in the nature of surface reactions.

To obtain the desired type of gas and to prevent the evolution of sulphur vapor, the sulphide or sulphur-bearing material is mixed with carbon and then heated to a relatively low temperature but sufficiently to cause a reaction between it and steam, which is now blown through it. The temperature may then be raised gradually to the maximum suitable for the reaction, discharging the gases all the time from a hotter part of the zone of reaction. This procedure enables any deleterious results to be avoided which might arise from passing over free sulphur or over relatively cooler sulphur-bearing material the hydrogen-sulphide-bearing gas which has been formed. These results may be obtained either intermittently or continuously.

Other features and advantages will hereinafter appear.

In the accompanying drawings—

Figure 1:
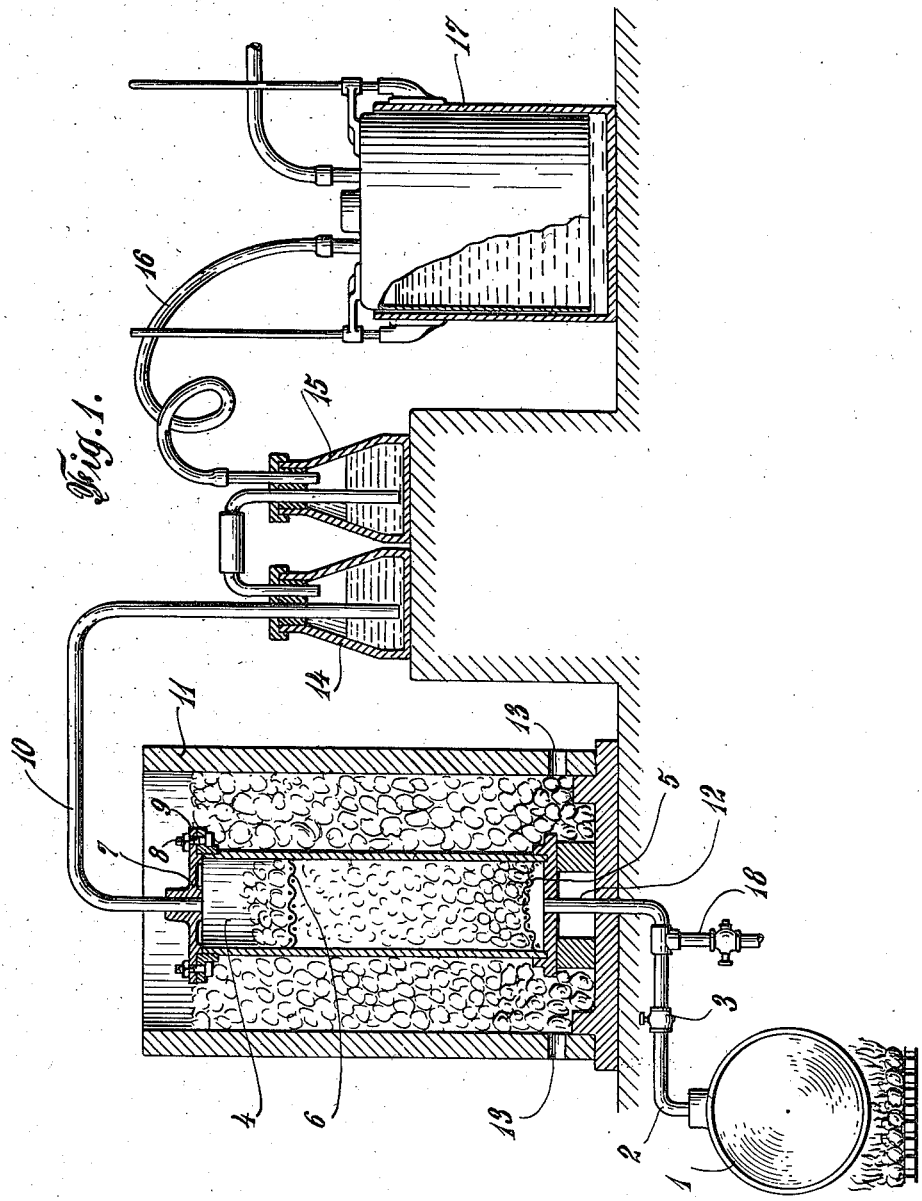
Figure 1 shows an apparatus suitable for evolving the hydrogen-sulphide-bearing gas from a closed retort and collecting it. The retort being afterwards recharged to produce another lot of gas.

In the procedure as carried on in the apparatus shown in Figure 1, steam is generated in a boiler 1 and conveyed by a pipe 2 having a valve 3 so that the steam is conveyed to the bottom of a retort 4 within which is piled a mixture of sulphur-bearing material, such as sulphide copper ore, preferably crushed to pea size and free from dust. The material retained on a twenty mesh sieve (Tyler standard) has been found very satisfactory. With this crushed ore was mixed rather less than 20% of its weight of charcoal or other carboniferous material in pieces of approximately the same size; the mixture being supported by a wire netting 5 laid across the bottom of the retort to prevent the pipe 2 from being blocked.

Above this mixture is placed a second wire netting 6, and above the netting 6 a layer of lime, or limestone, or residual lime from a previous run, this lime material amounting to about 10% of the total charge below the wire netting 6. It has been found that these various forms of lime are almost equally efficient for the purpose which will be described more in detail later on. When the retort is thus filled, its top 7 is bolted down by bolts 8 passing through flanges 9 of a usual form. A pipe 10 through the top 7 conveys away the gases produced. It has been found advisable to have the total content of sulphur in the mixture beneath the netting 6 less than 30% of the mixture. If the sulphur-bearing material used produces a mixture of greater sulphur content, it has been found advisable to mix inert material therewith, such as quartz or the gangue of ores.

The retort 4 is externally heated and to this end is shown as standing within an open topped furnace 11, with charcoal packed around the retort between the retort and the walls of the furnace 11. The furnace is preferably started by igniting the charcoal at the top and the steam turned on by opening the valve 3. The steam is preferably carried through a short section 12 of the pipe 2 within the furnace and to some extent subjected to the heat thereof with superheating action. I have found in the use of this apparatus that the retort produced the best gas when heated by the furnace 11 so that its temperature varied from about 400° C. at the bottom near the netting 5, to about 700° C. at the top near the netting 6, the fire having been controlled by vents 13 of a kind usually found in such furnaces.

The effluent gases carried through the pipe 10 when made in this way consisted mainly of hydrogen sulphide but also contained carbon dioxide, hydrogen and free steam. A little sulphur vapor accompanied the gases.

In the apparatus as shown in Figure 1, the gases are led through the pipe 10 to the bottom of a wash bottle, shown diagrammatically at 14, containing water, and from that to a second wash bottle, shown diagrammatically at 15, and thence by a pipe 16 to a gasometer or temporary holder 17.

The gases in one test were made from clean granular (pea-sized) iron pyrites mixed with 17% of charcoal, and covered with a layer amounting to about 10% of lime. The lime was partly calcium sulphide, being material recovered from a previous test. The retort containing the pyrites, charcoal and lime material was heated to 700° C. as a maximum.

If it is desired to increase the carbon dioxide content of my mixed gases the proportion of carboniferous matter may be increased. To obtain increased carbon dioxide without correspondingly increasing the hydrogen content of the mixed gases, air under pressure may be admitted to the retort, as by a valved pipe 18 connected to the steam pipe 2. An objection to introducing air is sometimes found in the fact that the nitrogen of the air dilutes the gases and requires bulkier apparatus where the gases are used for certain purposes.

Figure 2:
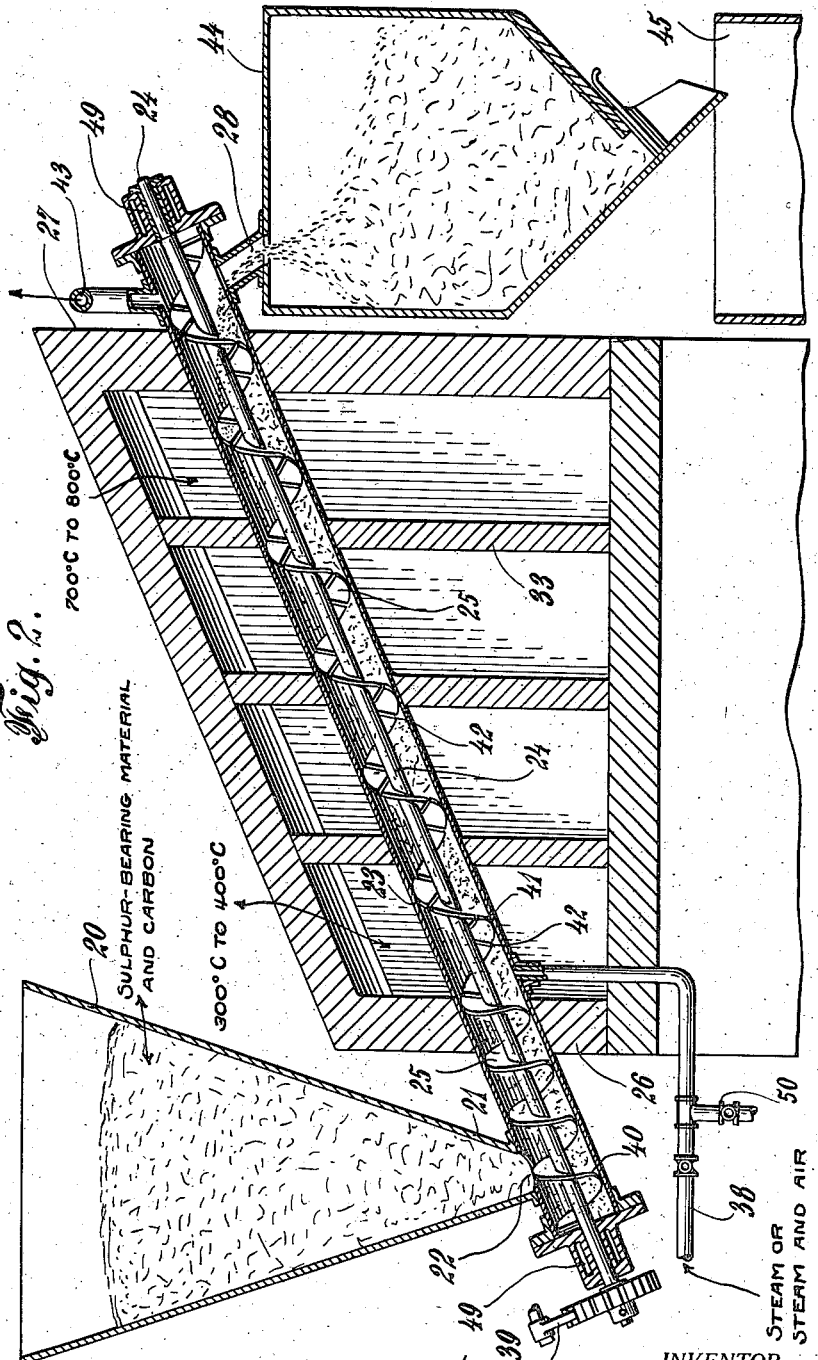
Figure 2 is a sectional side view of an apparatus for the continuous production of the gas.
Figure 3:
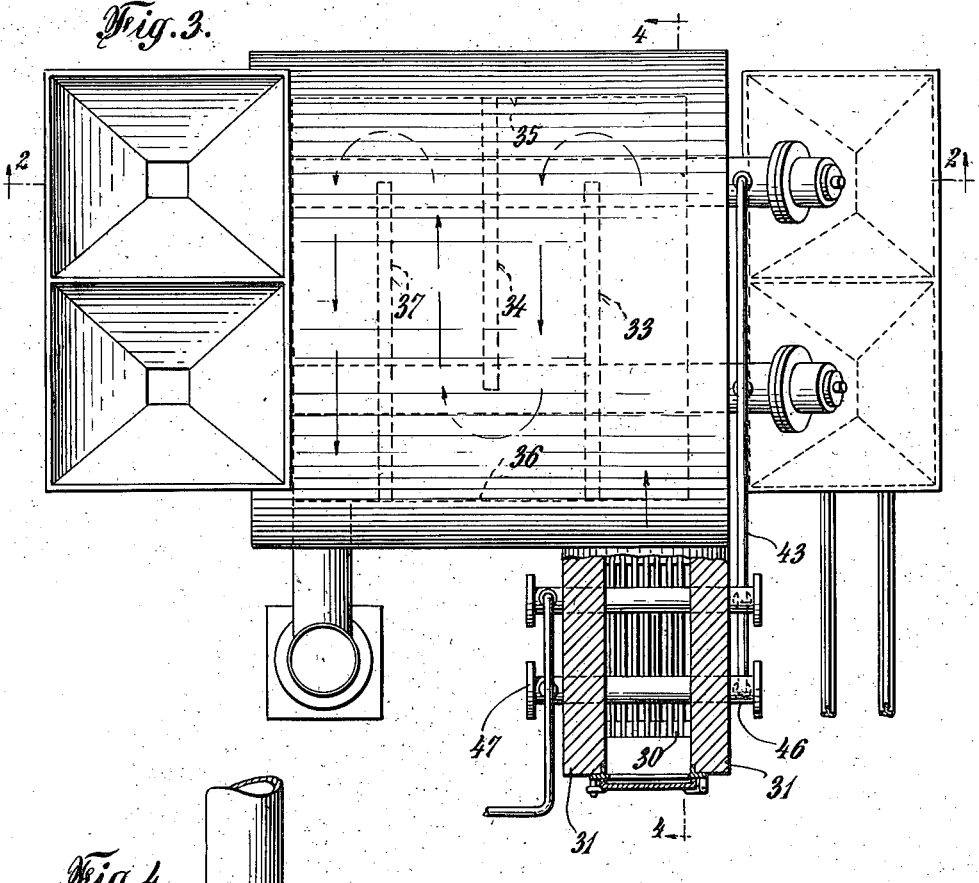
Figure 3 is a plan view of the apparatus of Figure 2.
Figure 4:
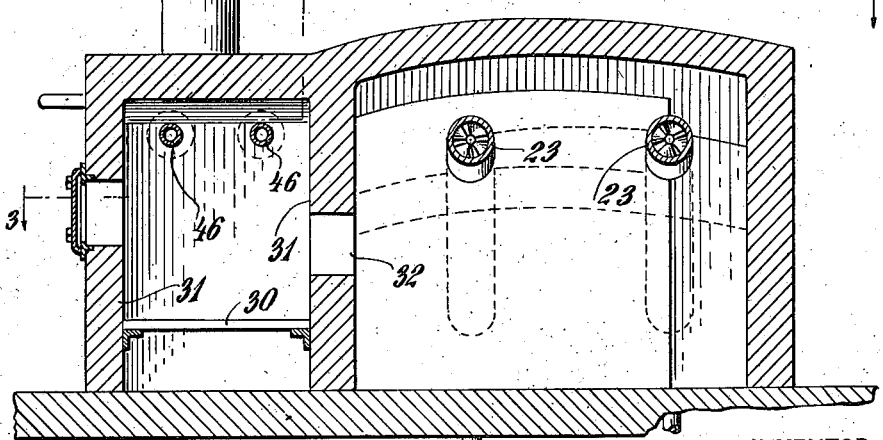
Figure 4 is a sectional end view of the same apparatus.

When it is desired to produce the gas continuously from a continuously operated apparatus, the apparatus shown in Figures 2, 3 and 4 may be used, in which the finely ground charge, usually in the form of sulphide of iron or in the form of froth-flotation concentrates of sulphide of copper or sulphides of copper and iron, together with the intimately mixed finely ground charcoal, is fed into a hopper 20 having a lower exit end 21, which opens at 22 into a retort 23. The retort 23 is preferably so placed that the point of discharge is higher than the main body of the retort. This ensures that the charge fills the whole diameter of the retort for at least quite a distance with the result that the steam and gases are forced through the charge instead of escaping past it at the periphery of the retort. The charged retort therefore may be called self-sealing. The retort is here shown as inclined upward from the end 21 of the hopper 1 and is provided with a suitable feeding device shown as a central shaft 24 on which is fast a suitable feed screw 25 for feeding the charge of material from the hopper 20. The retort, which may be some six or nine feet long within the furnace walls 26 and 27, is usually heated to a higher temperature at its upper end near the discharge opening 28, than it is elsewhere heated.

For this purpose there is provided a fire box having grate bars 30, located with suitable walls 31, so that fuel burning upon the grate bars 30 discharges hot gases part way up one of the side walls through an opening 32 near the upper end of the retort 23. The hot gases and products of combustion from the fire box are carried past the retort shown in Figure 2 and any other of the plurality of retorts which usually make up an operating unit, two being shown in Figures 3 and 4. For thus carrying the hot products of combustion past the upper ends of all the retorts there is provided a baffle wall 33 which extends across the furnace between the walls 26 and 27 far enough to carry the hot products of combustion past the retort 23 most remote from the fire box. The baffle wall 33, like the other baffle walls hereinafter described, may be built of loose brick to facilitate the tearing down of the retorts for repairs or other purposes as occasion may arise. After the hot products of combustion have passed the last retort 23 they are carried back past that retort and all the other retorts to the first retort because a second baffle wall 34 extending from the end wall 35 of the furnace carried them toward the end wall 36 nearest the grate bars 30, with the result that the retorts are again heated by the products of combustion, although to a less degree than at their upper ends.

For the purpose of progressively heating the retorts toward their ends to a suitable extent there are provided as many more baffle walls 37 as may be necessary in addition to the walls 33 and 34, only one such wall 37 being illustrated.

With the structure just described, it is possible to heat the upper ends of the retorts substantially to 700° or 800° centigrade, and the lower ends to 300° to 400° centigrade, thus obtaining the heating which seems most effective.

In order to obtain the desired reactions, steam is supplied in some form, either by feeding the charge wet with the requisite amount of water or by a valved steam pipe 38 carried within the walls to the retort, so that the proper amount of water vapor to produce hydrogen sulphide may be furnished. By having the steam pipe 38 well within the furnace wall 26, a desirable dryness of the steam may be assured. This separate supplying of steam enables the charge to be fed dry, which is sometimes advantageous. In order to feed the material in the desired way and to obtain the proper mixture of it, the screw 25 may be driven compartively slowly by a pawl and ratchet device 39, and the screw may be suitably constructed to suit the purpose in hand.

As herein illustrated, the screw 25 has a comparatively small pitch outside the wall 26 as shown at 40. Within the wall 26 the spiral has a larger pitch, as shown at 41. To insure continuous and proper mixing of the various ingredients of the charge, the spiral may have slots or openings 42, suitably located so that though the spiral as a whole feeds the charge forward, a part of the charge is always being stirred at each one of the slots or openings 42 by slipping past the edges of the slot, while a good part of the material of the charge is fed on by the adjacent solid portion of the spiral. The amount of steam and rapidity of the feeding and the heating are so adjusted that the gas discharged from the pipe 43 at the upper end of the retort, and usually outside the wall 27, consists very largely of hydrogen sulphide and carbon dioxide, carrying as little other sulphur compounds as the exigencies of efficient working will permit. The exhausted sulphide and other material discharged from the top of the retort through the exit 28 falls into a closed hopper 44, from which it may be removed at intervals in suitable wagons 45, or otherwise.

For the purpose of improving the quality of the gases produced it is advantageous to bring them into contact with a material such as lime or impure lime, which is heated to usually about the same temperature as the upper ends of the retorts, with the apparent result that sulphur vapor carried by the gases reacts with the other gases or vapors present either to produce useful hydrogen sulphide, or to produce substances which are at least comparatively innocuous for the froth flotation separation processes or other processes for which the gas may be used. To obtain this result, the gases carried by the pipe 43 are shown as carried to lime retorts 46 extending across the upper part of the fire box considerably above the side opening 32, so that the lime retorts 46 are heated only by the radiant heat from the fire on the grate bars 30, and from the radiant heat of the products of combustion. For this purpose the lime retorts may be supported mainly or largely in the walls 31 of the furnace and may be extended outside the walls 31 and be provided with suitable closures 47 to enable them to be cleaned or the lime material to be replaced as desired. From the lime retorts 46, the gas is carried by the pipe 28 for further treatment, or storage, or for immediate use, as the case may be. The pipe 43 is advantageously maintained at such a high temperature that sulphur will not condense in it, and for this purpose in some climates at least it will be found necessary to carry it within the muffle wall or to provide it with a covering of heat-insulating material.

The retort may be provided with suitable gas-tight packing glands 49, which serve to support the shaft 24, which carries the spiral feed device 25.

There may be provided a valved air admission pipe 50, connected to a suitable supply of compressed air (not shown) for the same purpose as the air pipe 18 of Figure 2.

This application is a continuation in part of my applications Serial Numbers 399,040, filed July 26, 1920 and 442,628, February 5, 1921.

The amounts of reagents set forth above are examples only and are subject to change to suit the needs of varying working conditions. So also the working conditions, if any, will be adjusted to different circumstances.

I claim:

1. A process of producing gas rich in hydrogen sulphide which consists in passing steam through a mixture including sulphur-bearing material and carbon and bringing the gas into contact with a lime material to modify objectionable sulphur compounds.

2. A process of producing a gas rich in hydrogen sulphide which consists in passing steam through a mixture including sulphur-bearing material and carbon and bringing the gaseous product including steam into contact with a lime material to modify objectionable sulphur compounds.

3. A process of producing a gas which consists in passing steam and a restricted amount of air through a mixture including sulphur-bearing material and carbon to produce a gas consisting largely of hydrogen sulphide.

In testimony whereof, I have affixed my signature to this specification.

HAROLD HARDY SMITH.